Dec. 13, 1960  H. B. LUBARSKY  2,964,213
PLUG DEVICE FOR CONTROLLING FLUID FLOW
Filed May 25, 1959
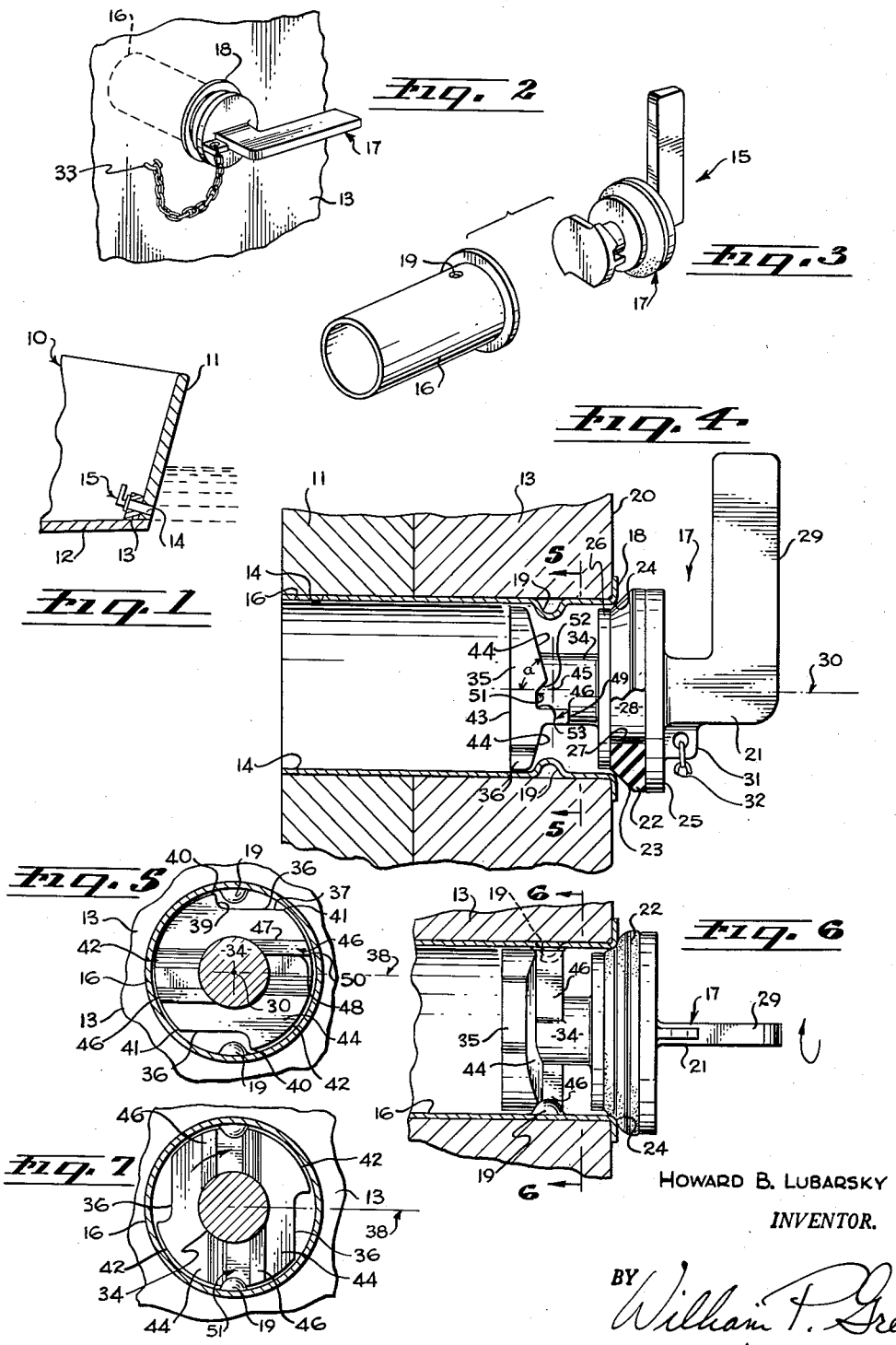
HOWARD B. LUBARSKY
INVENTOR.
BY William P. Green
ATTORNEY

United States Patent Office 2,964,213
Patented Dec. 13, 1960

2,964,213

PLUG DEVICE FOR CONTROLLING FLUID FLOW

Howard B. Lubarsky, Pasadena, Calif., assignor to Crest Marine Hardware Co., Inc., Los Angeles, Calif., a corporation of California Filed May 25, 1959, Ser. No. 815,613

5 Claims. (Cl. 220—40)

This invention relates to an improved device for controlling the flow of a fluid along a predetermined path, and which in certain respects is particularly adapted for use as a transom drain plug or closure in a motor boat.

In small boats, it is customary to provide, in the lower portion of the transom at the rear of the boat, a plug or a valve which is adapted to be opened when the boat is underway, in order to allow any water which has accumulated in the bottom of the boat to be withdrawn therefrom by suction created by the motion of the boat in the water. A major object of the present invention is to provide a unique plug valve which is especially adapted for use in controlling the flow of water at this draining location in a boat. A device constructed in accordance with the invention is capable of very effectively and completely closing off all communication between the interior and exterior of the boat at the drain location, when desired, and yet when opened will allow the unobstructed flow of water entirely through the device to permit the ejector action produced by the motion of the boat to draw water through the device in a very positive manner. Further, when the device is in its closed condition, the plug is releasably locked in that condition in a manner assuring against accidental opening of the valve.

An additional object of the invention is to provide a device which will attain the various above discussed operational advantages, and yet at the same time is structurally extremely simple and inexpensive to manufacture, and is ruggedly built in a manner assuring its effective use over a very long period of time. Structurally, a valve embodying the invention includes a tubular body part defining a passage through which water or other fluid may flow, but which is adapted to receive a closure plug capable of closing off the flow of fluid through the body. The body section of the device has a shoulder extending about the passage, and which is engageable in sealing relation by a mating shoulder formed on the plug, to close off the fluid flow through the device. One of the shoulders may be formed as a resiliently deformable seal element, typically a rubber seal ring carried by the plug. The plug is adapted to be inserted and actuated by a handle formed at the outer end of the plug, and adapted to be manually engaged by a user.

In order to releasably secure the plug in its closed position of engagement with the tube, the plug has a portion which is receivable within the tube, and which is engageable with one or more lugs (preferably two) projecting radially inwardly from the side wall of the tube. This portion of the plug may take the form of an enlarged head carried at the axially inner end of a shank portion of the plug, which may project axially inwardly from and beyond the sealing shoulder which is formed on the plug. The head or other locking portion of the plug has a cam surface adapted to engage the lug or lugs formed on the body of the device, in a relation tightening the interengagement between the sealing shoulders as a result of the rotational movement of the plug through a predetermined angle. Preferably, after the plug has been turned through this angle, the lug or lugs fall into locking notches or grooves, which releasably detent the plug against reverse valve opening rotation of the plug. The plug thus snaps very positively into its locked closed position, so that in order to remove the plug it is necessary to purposely force the plug in a reverse rotary direction. As a result, the device is effectively latched in closed position in a manner positively preventing accidental opening of the plug.

The above and other features and objects of the present invention will be better understood from the following detailed description of the typical embodiment illustrated in the accompanying drawing in which:

Fig. 1 is a fragmentary vertical section through the rear transom portion of a motor boat, having a transom drain plug constructed in accordance with the invention.

Fig. 2 is an enlarged fragmentary perspective view of the transom drain plug of Fig. 1;

Fig. 3 is an exploded perspective view of the transom drain plug and associated body part;

Fig. 4 is an enlarged section taken through the plug assembly;

Fig. 5 is a transverse section taken on line 5—5 of Fig. 4;

Fig. 6 is a view similar to Fig. 4, but showing the plug in its locked or closed position; and Fig. 7 is a transverse section taken on line 7—7 of Fig. 6.

Referring first to Fig. 1, I have shown fragmentarily at 10 the rear portion of a conventional motor boat, having the rear upwardly extending transverse transom 11, connecting at its lower end to the bottom wall 12 of the boat. A transverse reinforcing board or member 13 is connected to the lower edge of the transom, with a drain passage 14 being formed through parts 11 and 13 as shown. When the boat is underway, the forward motion of the boat will function to pull any accumulated water from within the boat rearwardly through passage 14 and to the exterior. This passage 14 is adapted to be closed by a closure or valve assembly 15, which is constructed in accordance with the invention.

With reference now to Figs. 3 and 4, this assembly 15 includes a tubular body part 16 which is connected into passage 14 in fixed relation with respect thereto, and which is adapted to be closed by a detachable plug assembly 17. Tube 16 may be considered as a straight cylindrical tube formed of sheet metal, and deformed to form a radially extending flange 18 at one end, and two diametrically opposed lugs 19 spaced inwardly from flange 18. The flange 18 abuts against a planar surface 20 formed on reinforcing member 13. The external diameter of the main tubular portion of body part 16 corresponds substantially to the internal diameter of passage 14 in parts 11 and 13, and is a tight enough fit therein to prevent the leakage of any water between the interior and exterior of the boat along the outer surface of tube 16. The two lugs or projections 19 take the form of simple approximately hemispherical dimples or upset areas formed by locally deforming the material of the side wall of part 16 radially inwardly at two diametrically opposite locations, as seen clearly in Figs. 4 and 5. The tight fit of part 16 within passage 14 in parts 11 and 13 of course very positively retains part 16 in a definitely fixed position relative to parts 11 and 13, so that there is no danger of displacing or removing part 16 as a result of the actuation of plug assembly 17.

The plug assembly 17 includes a main plug part 21 and a deformable preferably elastomeric seal ring 22 carried by part 21. This ring 22 is typically formed of neoprene or other elastomeric material, and has the cross-sectional configuration shown in the lower portion of Fig. 4. More particularly, ring 22 has a frustro-conically tapering seal surface 23, which is adapted to annularly engage the annular seating corner or shoulder formed at 24 on part 16, to thereby close off fluid flow through tube 16. The ring 22 is confined axially between two axially spaced annular flanges 25 and 26 formed on and projecting radially outwardly from plug 21. The inner surface 27 of seal ring 22 extends axially, and is a close fit on a cylindrical surface 28 formed on plug 21 between flanges 25 and 26. The ring 22 is thus very effectively confined and held in fixed position relative to the rest of plug 21.

Plug 21 may take the form of a metal casting, having an integral handle portion 29 formed at its outer end to allow manual actuation of the plug. This handle portion projects laterally with respect to the main rotary axis 30 of the plug, which axis coincides with the central axis of tubular body part 16 of the device. Adjacent handle 29, the plug may have an integral eye portion 31, to which a chain 32 is connectible, with the other end of the chain being connected by a staple or other fastener 33 to member 13 or some other structural part of the boat. This chain of course functions to prevent accidental loss of plug 21, when it is detached from body 16 of the valve structure.

Projecting axially inwardly beyond inner flange 26, plug 21 has an integral reduced diameter shank portion 34, which carries an enlarged diameter head portion 35 at its axially inner end. Shank 34 is typically externally cylindrical, and centered about main axis 30 of the device. As seen best in Fig. 5, the enlarged head 35 of the plug is essentially circular in transverse section, except at the locations of two diametrically opposed notches or cutaway areas 36, which are dimensioned and shaped to receive the two lugs 19 of part 16, so that head 35 may be inserted axially inwardly past these lugs. More particularly, each of the notches 36 may be defined as having a straight edge portion 37, extending parallel to a line 38 which passes through the main axis 30 of the device. This straight line 37 merges with a curving surface or edge 39, which progressively curves outwardly to a point 40 on the periphery of head 35. The straight edges 37 of notches 36 meet the circular periphery of head 35 at points 41 in Fig. 5. Extending circularly between the two notches or cutaways 36, head 35 has two externally cylindrical outer surfaces 42, centered about the main axis 30 of the plug, and of a diameter slightly smaller than the internal diameter of cylindrical body part 16. Thus, these two cylindrical surfaces 42 act to effectively center head 35 within part 16. The axially inner side of head 35 may take the form of a directly transverse flat surface 43 (see Fig. 4).

During axial insertion of plug 21 into body part 16, the plug is held in the rotary position represented in Figs. 4 and 5. In this position, plug 35 can move axially inwardly past the two lugs 19, by virtue of the fact that the two diametrically opposed notches 36 formed in the head are deep enough to receive and pass lugs 19 respectively. For coacting with the lugs, after head 35 has thus moved axially past these lugs, the head has two cam surfaces 44. Each of these surfaces 44 may be planar, and extend at an angle "a" with respect to axis 30 of the plug. This angle "a" is such that the cam surfaces 44 advance axially inwardly (to the left as seen in Fig. 4) as surfaces 44 advance radially outwardly toward the two notches 36 respectively. As will be understood clearly from Fig. 4, the two surfaces 44 taper in directly opposite directions. To define these surfaces 44 somewhat differently, it is noted that if the two surfaces 44 were extended inwardly toward axis 30, the planes of surfaces 44 would intersect in a straight line passing transversely through axis 30 at the point designated 45 in Fig. 4 (the intersection line extending directly perpendicular to the plane in which Fig. 4 is taken). To effect a proper camming action, the angle a between each cam surface 44 and axis 30 may be between about eleven and thirteen degrees, and preferably about twelve degrees.

Each of the two cam surfaces 44 extends through a substantial annular extent about axis 30. At one end, each of these surfaces 44 terminates at a stop shoulder 46, which projects axially outwardly from head 35 in a direction toward the previously mentioned flange 26. This stop shoulder 46 also extends generally radially outwardly from shank 34 (and approximately tangentially with respect thereto) to the periphery of head 35. To define one of these stop shoulders 46 somewhat more specifically, this shoulder 46 is defined at one side by a planar surface 47 which is substantially tangential with respect to the outer cylindrical surface of shank 34, and which is parallel to a plane containing axis 30 and the previously mentioned line 45. At its opposite side, shoulder 46 has a surface 48 which extends parallel to surface 47, and also extends outwardly from shank 34 to the periphery of head 35. At its axially outer end, each of the shoulders 46 is defined by a transverse surface 49 (see Fig. 4). At the radially outer end of each shoulder 46, the shoulder may have a cylindrical surface 50 forming a continuation of outer cylindrical surface 42 of the head.

As previously mentioned, one end of each of the cam surfaces 44 extends up to one of the stop shoulders 46. The other end of cam surface 34 terminates at a detent notch 51 (see Fig. 4), which is adjacent the second of the stop shoulders 46. This detent notch 51 has an axially inwardly curving wall 52, which terminates in a transverse surface 53 defining the deepest portion of the notch, directly adjacent one of the stop shoulders 46. As will be apparent, the two notches 51 extend in directions which are parallel to the directions in which the two stop shoulders 46 extend outwardly from shank 34 toward the periphery of the head.

To now define the manner of use of the illustrated plug, assume that part 16 has been effectively mounted within wooden members 11 and 13 of a boat, and is held stationarily by those parts in sealed relation with respect thereto. If it is then desired to close the fluid passage through part 16, a user merely grasps handle portion 29 of plug 21, and inserts the shank 34 and head 35 of the plug axially into tube 16 with the plug held in the rotary position represented in Figs 4 and 5. In this position, the notches 36 allow the head to pass axially inwardly past the two lugs 19 formed by the side wall of part 16, so that the plug ultimately reaches the position represented in Fig. 4. With the plug in this completely inserted position, handle 29 is turned in a clockwise direction (as viewed in Fig. 5) so that the two cam surfaces 44 engage the axially inner sides of the two body carried lugs 19 respectively. As the plug is turned in a clock-wise direction, the lugs 19 engage portions of cam surfaces 44 which are progressively advancing in an axially outward direction (to the right as seen in Fig. 4) as these surfaces advance circularly. Consequently, a camming action ensues which draws plug 21 axially inwardly (to the left in Fig. 4) in a manner tightly engaging elastomeric seal ring 22 with seating surface 24 on part 16. The dimensioning of the parts is such that the engagement between ring 22 and surface 24 causes a very substantial deformation of ring 22 (see Fig. 6) with a consequent very tight annular fluid seal being formed between the plug and body 16. Upon continued rotation of handle 29, lugs 19 eventually reach and fall into detent notches 51, to releasably detent the plug against accidental counter-clockwise opening movement. When the lugs 19 are in their respective detenting notches 51, the seal ring 22 is still very substantially deformed in the manner shown in Fig. 6, to maintain the positive seal between the plug and body. Engagement of lugs 19 with stop shoulders 46 prevents further clockwise rotation of handle 29 and the plug, and the user is in this way apprised of the fact that the plug has been turned to its completely closed condition. Also, it has been found that the detent notch arrangement illustrated produces a very noticeable click when the valve reaches its closed position, further indicating a condition of complete closure to the user.

With the valve in this closed and locked condition, there is no chance of accidental opening of the plug. However, when a user desires to purposely open the plug, in order to allow for ejector type drainage of the bottom of the boat when the boat is underway, the user may very simply and easily turn handle 29 and the plug in a counter-clockwise direction, forcing lugs 19 out of detent notches 51, so that the plug may reach the Fig. 5 position in which it can be easily withdrawn axially outwardly from within part 16. In thus opening the plug, it is noted that the inclined surfaces 52 formed at the entrance side of detent notches 51 function as cam surfaces for camming the plug axially inwardly as lugs 19 climb out of their detent notches 51.

I claim:

1. The combination comprising an essentially tubular body having a fluid passage extending therethrough, means forming a seal shoulder extending about said passage near an axially outer end of said body, a plurality of lugs projecting essentially radially inwardly from the side wall of said tubular body at circularly spaced locations and at a location spaced axially inwardly from said shoulder, and a closure plug adapted to be inserted in and close said passage and adapted to be turned through a predetermined angle while in the passage, said plug having a shank portion receivable in said passage in an axially extending position and having a transverse dimension which is small as compared with the diameter of the passage, said shank being spaced essentially annularly from the wall of said passage, said plug having a first flange at the axially outer end of said shank and having a transverse dimension larger than the shank, means forming a second shoulder on said flange carried by said plug and engageable axially inwardly against said first mentioned shoulder about said passage to close off fluid flow through the passage, said plug having a handle at the axially outer side of said flange by which a user can insert and remove the plug and turn it relative to said body, said plug having a second flange at the axially inner end of said shank projecting radially outwardly in all transverse directions from said shank to a transverse dimension substantially larger than the shank, said second flange being of an essentially circular transverse section and of a diameter slightly less than said tubular body, said second flange having a plurality of cutaway areas at circularly spaced locations cut away entirely axially through the thickness of said second flange and shaped to pass said lugs respectively as the second flange moves inwardly therepast in one rotary setting of the plug, said second flange having a face at its axially outer side facing generally axially outwardly toward said first flange and disposed essentially annularly about said shank, said face of the second flange forming a plurality of cam surfaces positioned to engage said lugs respectively and disposed at camming inclinations to displace the plug axially inwardly, and thereby tighten said second shoulder against said first shoulder, in response to said turning of the plug through said predetermined angle relative to the body, said face of the second flange having a plurality of detent notches facing toward said first flange and located circularly beyond said cam surfaces at locations to receive said lugs, at the end of said predetermined turning movement of the plug, and thereby detent the plug against releasing rotary movement relative to the body.

2. The combination comprising an essentially tubular body having a fluid passage extending therethrough, means forming a seal shoulder extending about said passage near an axially outer end of said body, a plurality of lugs projecting essentially radially inwardly from the side wall of said tubular body at circularly spaced locations and at a location spaced axially inwardly from said shoulder, and a closure plug adapted to be inserted in and close said passage and adapted to be turned through a predetermined angle while in the passage, said plug having a shank portion receivable in said passage in an axially extending position and having a transverse dimension which is small as compared with the diameter of the passage, said shank being spaced essentially annularly from the wall of said passage, said plug having a first flange at the axially outer end of said shank and having a transverse dimension larger than the shank, means forming a second shoulder on said flange carried by said plug and engageable axially inwardly against said first mentioned shoulder about said passage to close off fluid flow through the passage, said plug having a handle at the axially outer side of said flange by which a user can insert and remove the plug and turn it relative to said body, said plug having a second flange at the axially inner end of said shank projecting radially outwardly in all transverse directions from said shank to a transverse dimension substantially larger than the shank, said second flange being of an essentially circular transverse section and of a diameter slightly less than said tubular body, said second flange having a plurality of cutaway areas at circularly spaced locations cut away entirely axially through the thickness of said second flange and shaped to pass said lugs respectively as the second flange moves inwardly therepast in one rotary setting of the plug, said second flange having a face at its axially outer side facing generally axially outwardly toward said first flange and disposed essentially annularly about said shank, said face of the second flange forming a plurality of cam surfaces positioned to engage said lugs respectively and disposed at camming inclinations to displace the plug axially inwardly, and thereby tighten said second shoulder against said first shoulder, in response to said turning of the plug through said predetermined angle relative to the body, said face of the second flange having a plurality of detent notches facing toward said first flange and located circularly beyond said cam surfaces at locations to receive said lugs, at the end of said predetermined turning movement of the plug, and thereby detent the plug against releasing rotary movement relative to the body, said face of the second flange having portions forming stop shoulders projecting axially from said face toward said first flange but spaced axially from the first flange and positioned circularly beyond said detent notches respectively at locations to engage said lugs and thereby prevent turning of the plug beyond said predetermined range of movement.

3. The combination comprising an essentially tubular body having a fluid passage extending therethrough, means forming a seal shoulder extending about said passage near an axially outer end of said body, a plurality of lugs projecting essentially radially inwardly from the side wall of said tubular body at circularly spaced locations and at a location spaced axially inwardly from said shoulder, and a closure plug adapted to be inserted in and close said passage and adapted to be turned through a predetermined angle while in the passage, said plug having a shank portion receivable in said passage in an axially extending position and having a transverse dimension which is small as compared with the diameter of the passage, said shank being spaced essentially annularly from the wall of said passage, said plug having a first flange at the axially outer end of said shank and having a transverse dimension larger than the shank, means forming a second shoulder on said flange carried by said plug and engageable axially inwardly against said first mentioned shoulder about said passage to close off fluid flow through the passage, said plug having a handle at the axially outer side of said flange by which a user can insert and remove the plug and turn it relative to said body, said plug having a second flange at the axially inner end of said shank projecting radially outwardly in all transverse directions from said shank to a transverse dimension substantially larger than the shank, said second flange being of an essentially circular transverse section and of a diameter slightly less than said tubular body, said second flange having a plurality of cutaway areas at circularly spaced locations cut away entirely axially through the thickness of said second flange and shaped to pass said two lugs respectively as the second flange moves inwardly therepast in one rotary setting of the plug, said second flange having a face at its axially outer side facing generally axially outwardly toward said first flange and disposed essentially annularly about said shank, said face of the second flange forming a plurality of cam surfaces positioned to engage said lugs respectively and disposed at camming inclinations to displace the plug axially inwardly, and thereby tighten said second shoulder against said first shoulder, in response to said turning of the plug through said predetermined angle relative to the body, said face of the second flange having a plurality of detent notches facing toward said first flange and located circularly beyond said cam surfaces at locations to receive said lugs, at the end of said predetermined turning movement of the plug, and thereby detent the plug against releasing rotary movement relative to the body, said face of the second flange having portions forming stop shoulders projecting axially from said face toward said first flange but spaced axially from the first flange and positioned circularly beyond said detent notches respectively at locations to engage said lugs and thereby prevent turning of the plug beyond said predetermined range of movement, said shank being externally essentially circular, and said stop shoulders extending outwardly essentially tangentially from said circular shank.

4. The combination as recited in claim 1, in which said second shoulder is formed by an annular elastomeric ring carried by said first flange.

5. The combination as recited in claim 1, in which said second shoulder is formed by an annular elastomeric ring carried within a radially outwardly facing essentially annular groove in said first flange.

References Cited in the file of this patent
UNITED STATES PATENTS

| | | |
|---|---|---|
| 208,292 | Carroll | Sept. 24, 1878 |
| 220,871 | Rutschman | Oct. 21, 1879 |

FOREIGN PATENTS

| | | |
|---|---|---|
| 28,845 | France | Jan. 8, 1925 |
| 546,473 | France | Aug. 24, 1922 |
| 852,958 | Germany | Oct. 20, 1952 |